US012739492B2

(12) United States Patent
Miyazawa et al.

(10) Patent No.: US 12,739,492 B2
(45) Date of Patent: Sep. 15, 2026

(54) CONTROL APPARATUS, CONTROL METHOD THEREOF, AND IMAGE CAPTURING APPARATUS

(71) Applicant: CANON KABUSHIKI KAISHA, Tokyo (JP)

(72) Inventors: Hitoshi Miyazawa, Kanagawa (JP); Yusuke Kazami, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/941,865

(22) Filed: Nov. 8, 2024

(65) Prior Publication Data

US 2025/0168482 A1 May 22, 2025

(30) Foreign Application Priority Data

Nov. 21, 2023 (JP) ................................ 2023-197588

(51) Int. Cl.
*H04N 23/61* (2023.01)
*H04N 23/69* (2023.01)
*H04N 23/695* (2023.01)

(52) U.S. Cl.
CPC ............ *H04N 23/61* (2023.01); *H04N 23/69* (2023.01); *H04N 23/695* (2023.01)

(58) Field of Classification Search
CPC .... H04N 23/663; H04N 23/61; H04N 23/695; H04N 23/69; H04N 23/687; H04N 23/6811; B65G 2203/041; G01S 3/7865; G06T 7/20; G06T 7/207; G06T 7/215; G06T 7/223; G06T 7/292; G08B 13/19606; G08B 13/19608
USPC .......................................................... 348/169
See application file for complete search history.

(56) References Cited

U.S. PATENT DOCUMENTS

2018/0332214 A1* 11/2018 Katayama ................ G02B 7/34
2022/0311941 A1* 9/2022 Nakao .................... H04N 23/69
2023/0209204 A1* 6/2023 Zu ........................ G06V 40/168
348/207.99

FOREIGN PATENT DOCUMENTS

JP 2017121042 A 7/2017

* cited by examiner

*Primary Examiner* — Thai Q Tran
*Assistant Examiner* — Nienru Yang
(74) *Attorney, Agent, or Firm* — Cowan, Liebowitz & Latman, P.C.

(57) ABSTRACT

A control apparatus detects a region of a subject in an image that has been captured, determines a target position, in the image, of the subject detected, in a case where the subject is tracked and changes an angle of view for shooting such that a position of the subject in the image becomes the target position. In a case where the entirety of the subject is included in the image captured, the apparatus determines the target position through first processing, and in a case where the entirety of the subject is not included in the image captured, the apparatus determines the target position through second processing different from the first processing.

15 Claims, 9 Drawing Sheets

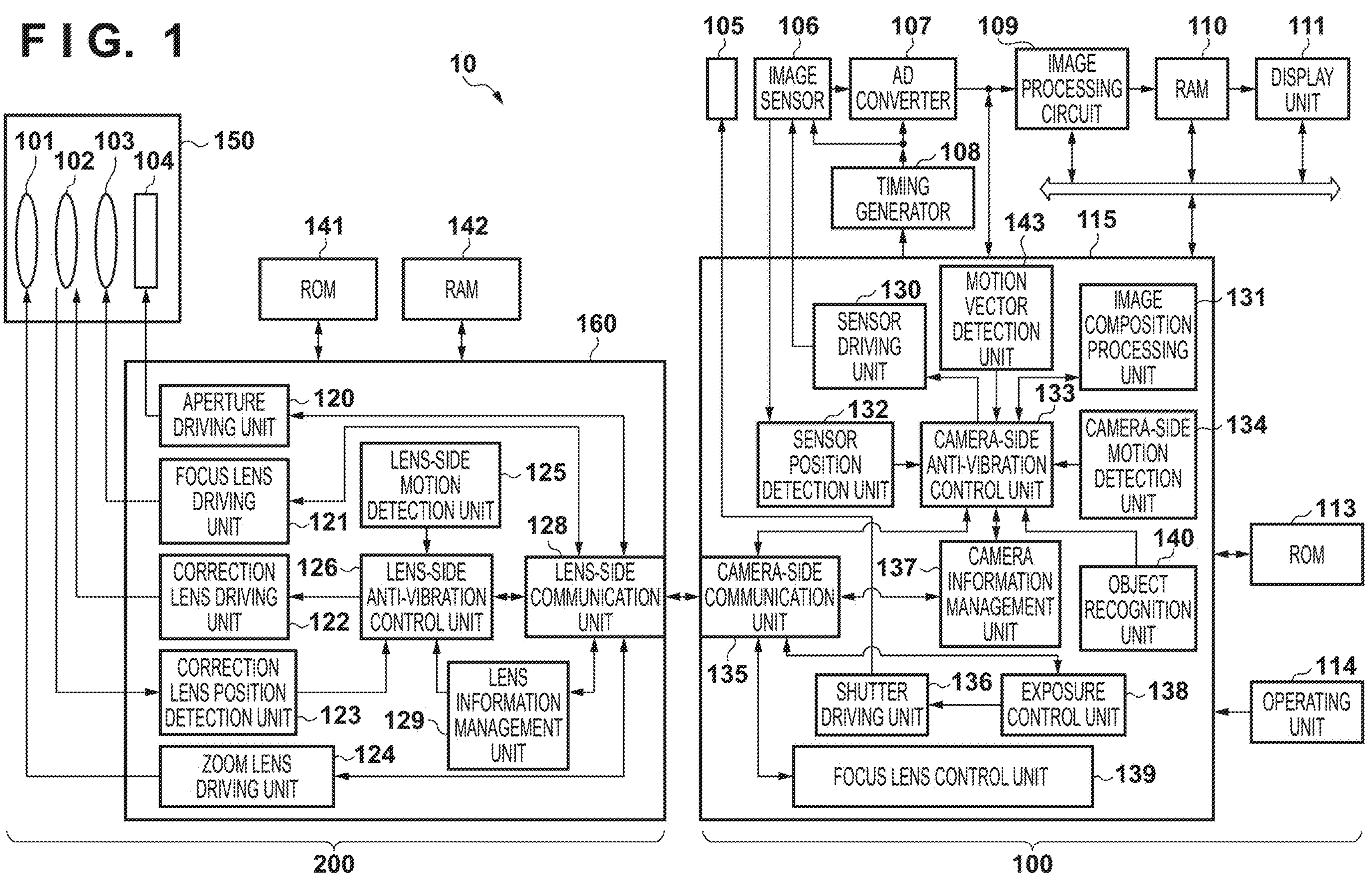
FIG. 1
10
150
101
102
103
104
141 ROM
142 RAM
160
120 APERTURE DRIVING UNIT
121 FOCUS LENS DRIVING UNIT
122 CORRECTION LENS DRIVING UNIT
123 CORRECTION LENS POSITION DETECTION UNIT
124 ZOOM LENS DRIVING UNIT
125 LENS-SIDE MOTION DETECTION UNIT
126 LENS-SIDE ANTI-VIBRATION CONTROL UNIT
128 LENS-SIDE COMMUNICATION UNIT
129 LENS INFORMATION MANAGEMENT UNIT
200
105
106 IMAGE SENSOR
107 AD CONVERTER
108 TIMING GENERATOR
109 IMAGE PROCESSING CIRCUIT
110 RAM
111 DISPLAY UNIT
115
143 MOTION VECTOR DETECTION UNIT
130 SENSOR DRIVING UNIT
131 IMAGE COMPOSITION PROCESSING UNIT
132 SENSOR POSITION DETECTION UNIT
133 CAMERA-SIDE ANTI-VIBRATION CONTROL UNIT
134 CAMERA-SIDE MOTION DETECTION UNIT
135 CAMERA-SIDE COMMUNICATION UNIT
137 CAMERA INFORMATION MANAGEMENT UNIT
140 OBJECT RECOGNITION UNIT
136 SHUTTER DRIVING UNIT
138 EXPOSURE CONTROL UNIT
139 FOCUS LENS CONTROL UNIT
113 ROM
114 OPERATING UNIT
100

FIG. 2

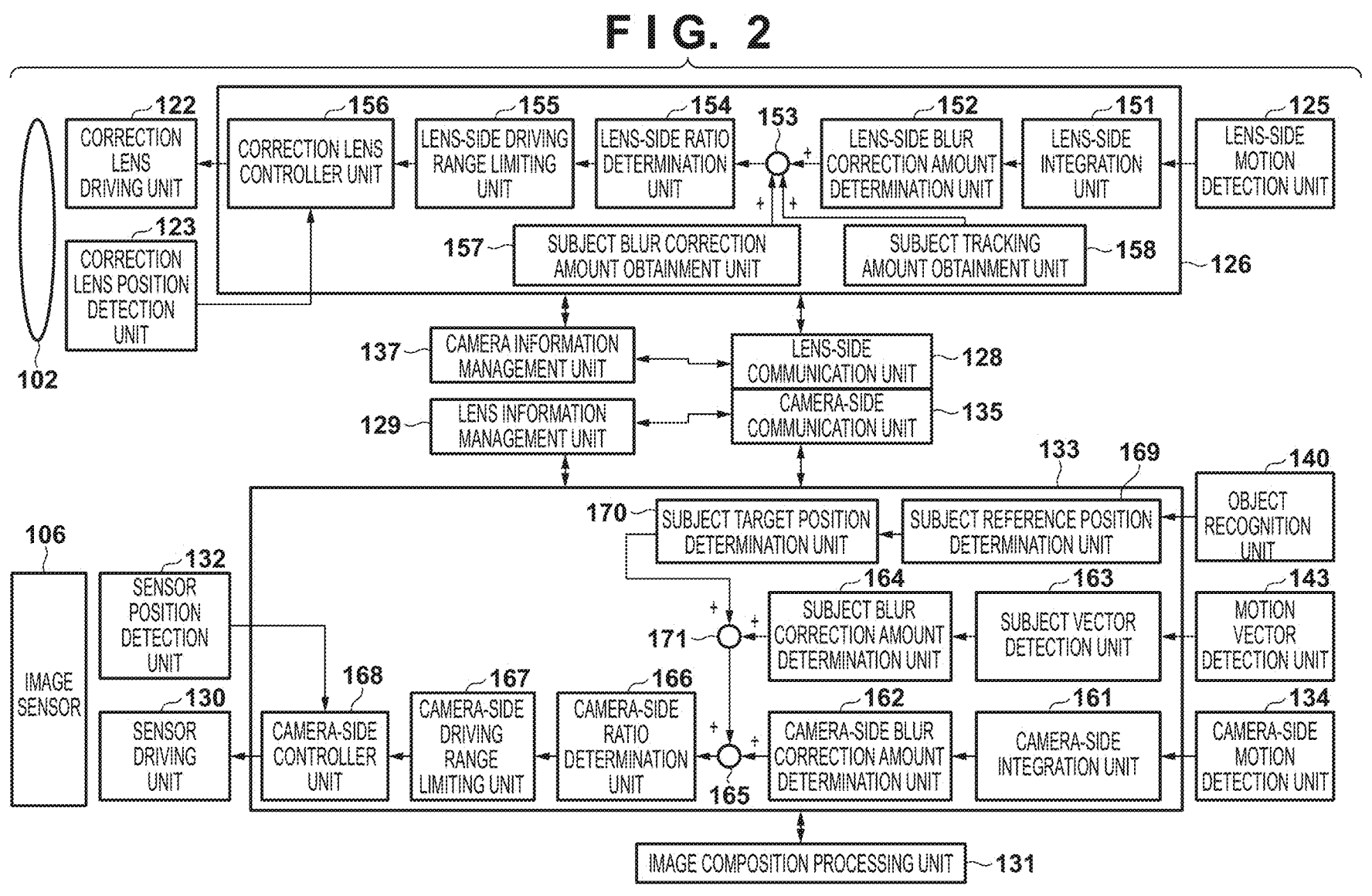

125 LENS-SIDE MOTION DETECTION UNIT
126
151 LENS-SIDE INTEGRATION UNIT
152 LENS-SIDE BLUR CORRECTION AMOUNT DETERMINATION UNIT
153
154 LENS-SIDE RATIO DETERMINATION UNIT
155 LENS-SIDE DRIVING RANGE LIMITING UNIT
156 CORRECTION LENS CONTROLLER UNIT
157 SUBJECT BLUR CORRECTION AMOUNT OBTAINMENT UNIT
158 SUBJECT TRACKING AMOUNT OBTAINMENT UNIT
122 CORRECTION LENS DRIVING UNIT
123 CORRECTION LENS POSITION DETECTION UNIT
102
128 LENS-SIDE COMMUNICATION UNIT
135 CAMERA-SIDE COMMUNICATION UNIT
137 CAMERA INFORMATION MANAGEMENT UNIT
129 LENS INFORMATION MANAGEMENT UNIT
140 OBJECT RECOGNITION UNIT
143 MOTION VECTOR DETECTION UNIT
134 CAMERA-SIDE MOTION DETECTION UNIT
133
169 SUBJECT REFERENCE POSITION DETERMINATION UNIT
163 SUBJECT VECTOR DETECTION UNIT
161 CAMERA-SIDE INTEGRATION UNIT
170 SUBJECT TARGET POSITION DETERMINATION UNIT
164 SUBJECT BLUR CORRECTION AMOUNT DETERMINATION UNIT
162 CAMERA-SIDE BLUR CORRECTION AMOUNT DETERMINATION UNIT
171
165
166 CAMERA-SIDE RATIO DETERMINATION UNIT
167 CAMERA-SIDE DRIVING RANGE LIMITING UNIT
168 CAMERA-SIDE CONTROLLER UNIT
131 IMAGE COMPOSITION PROCESSING UNIT
132 SENSOR POSITION DETECTION UNIT
130 SENSOR DRIVING UNIT
106 IMAGE SENSOR

301

FREQUENCY

PIXEL

0

302

303

304

305

309

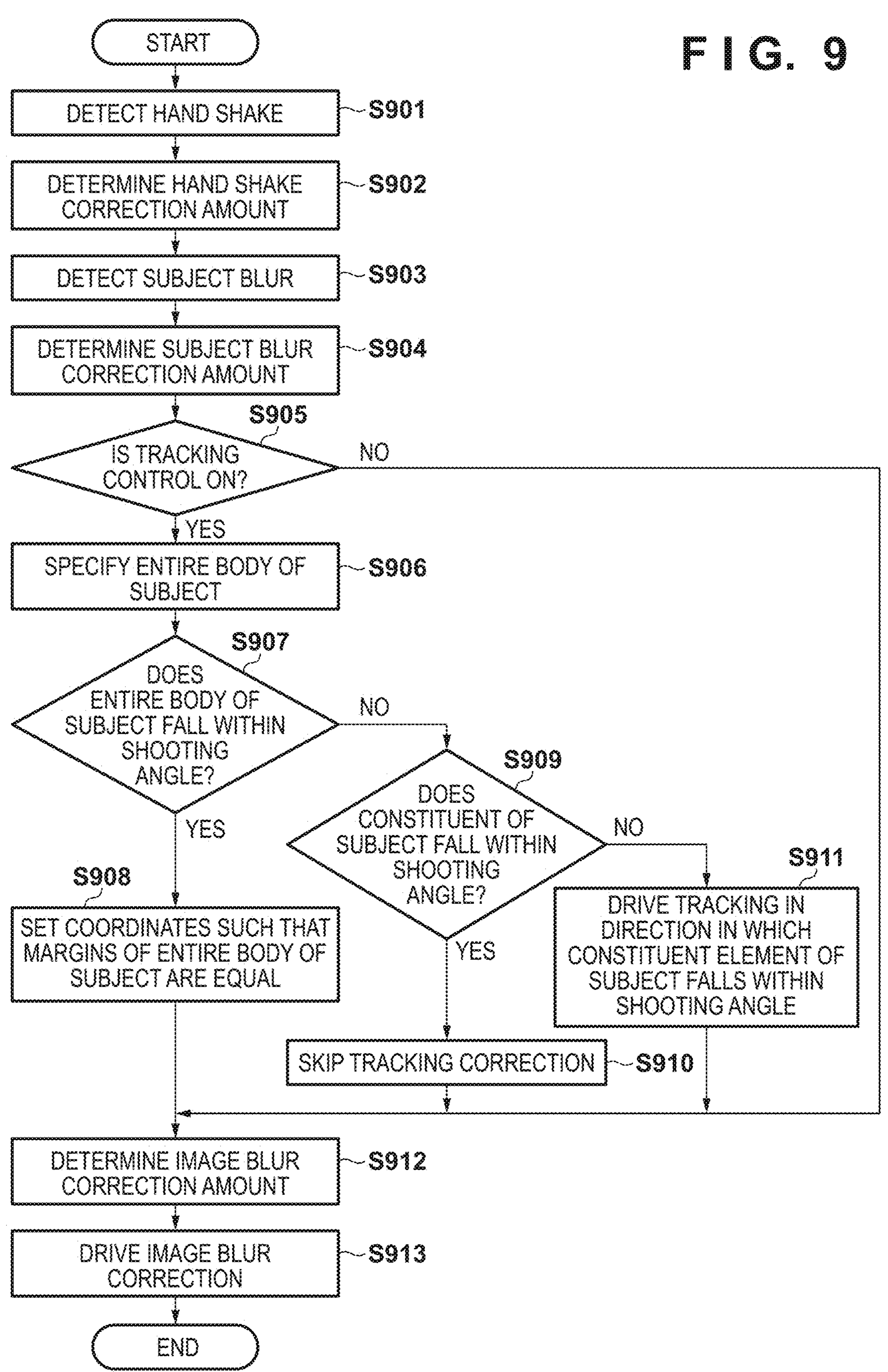
FIG. 9
START
DETECT HAND SHAKE
S901
DETERMINE HAND SHAKE CORRECTION AMOUNT
S902
DETECT SUBJECT BLUR
S903
DETERMINE SUBJECT BLUR CORRECTION AMOUNT
S904
S905
IS TRACKING CONTROL ON?
NO
YES
SPECIFY ENTIRE BODY OF SUBJECT
S906
S907
DOES ENTIRE BODY OF SUBJECT FALL WITHIN SHOOTING ANGLE?
NO
YES
S909
DOES CONSTITUENT OF SUBJECT FALL WITHIN SHOOTING ANGLE?
NO
YES
S908
SET COORDINATES SUCH THAT MARGINS OF ENTIRE BODY OF SUBJECT ARE EQUAL
S911
DRIVE TRACKING IN DIRECTION IN WHICH CONSTITUENT ELEMENT OF SUBJECT FALLS WITHIN SHOOTING ANGLE
SKIP TRACKING CORRECTION
S910
DETERMINE IMAGE BLUR CORRECTION AMOUNT
S912
DRIVE IMAGE BLUR CORRECTION
S913
END

CONTROL APPARATUS, CONTROL METHOD THEREOF, AND IMAGE CAPTURING APPARATUS

BACKGROUND OF THE INVENTION

Field of the Invention

The present invention relates to a control apparatus, a control method thereof, and an image capturing apparatus.

Description of the Related Art

Recently, in image capturing apparatuses such as digital still cameras, a technique is known in which subject recognition technology is used to recognize a subject in an image, and the recognized subject is tracked so as to keep the subject at a predetermined position within the angle of view and stabilize the framing. Japanese Patent Laid-Open No. 2017-121042 discloses a technique in which a tracking correction amount in a correction lens for tracking a subject is calculated such that the center position of a recognized subject region is the center of the image, and the tracking correction amount is then changed based on a likelihood of the recognized subject. The technique disclosed in Japanese Patent Laid-Open No. 2017-121042 makes it possible to prevent erroneous tracking operations and perform highly-responsive tracking.

Incidentally, when a subject which is a moving object is shot during panning, for example, the subject may be shot in a variety of different compositions according to the photographer's intentions in the shooting. However, the past technique described above does not take into account properly tracking a subject throughout scenes shot with different intentions.

SUMMARY OF THE INVENTION

Having been achieved in light of the foregoing issue, the present invention provides a technique that enables a subject which is the target of tracking to be shot appropriately according to the scene.

In order to solve the aforementioned issues, one aspect of the present disclosure provides a control apparatus comprising: a detection unit configured to detect a region of a subject in an image that has been captured; a determination unit configured to determine a target position, in the image, of the subject detected, in a case where the subject is tracked; and a control unit configured to change an angle of view for shooting such that a position of the subject in the image becomes the target position, wherein in a case where the entirety of the subject is included in the image captured, the determination unit determines the target position through first processing, and in a case where the entirety of the subject is not included in the image captured, the determination unit determines the target position through second processing different from the first processing.

Another aspect of the present disclosure provides an image capturing apparatus comprising: an image capturing unit configured to capture an image; a detection unit configured to detect a region of a subject in an image that has been captured; a determination unit configured to determine a target position, in the image, of the subject detected, in a case where the subject is tracked; and a control unit configured to change an angle of view for shooting such that a position of the subject in the image becomes the target position, wherein in a case where the entirety of the subject is included in the image captured, the determination unit determines the target position through first processing, and in a case where the entirety of the subject is not included in the image captured, the determination unit determines the target position through second processing different from the first processing.

Still another aspect of the present disclosure provides a method of controlling a control apparatus, the method comprising: detecting a region of a subject in an image that has been captured; determining a target position, in the image, of the subject detected, in a case where the subject is tracked; and changing an angle of view for shooting such that a position of the subject in the image becomes the target position, wherein in a case where the entirety of the subject is included in the image captured, the target position is determined through first processing in the determining, and in a case where the entirety of the subject is not included in the image captured, the target position is determined through second processing different from the first processing in the determining.

According to the present invention, a subject which is the target of tracking can be shot appropriately according to the scene.

Further features of the present invention will become apparent from the following description of exemplary embodiments (with reference to the attached drawings).

BRIEF DESCRIPTION OF THE DRAWINGS

FIG. 1 is a block diagram illustrating an example of the functional configuration of a digital camera serving as an example of an image capturing apparatus according to an embodiment.

FIG. 2 is a block diagram illustrating the configuration related to image blur correction in FIG. 1 in more detail.

FIG. 9 is a flowchart illustrating image blur correction control according to the embodiment.

DESCRIPTION OF THE EMBODIMENTS

Figures 3A, 3B, 3C, 3D:
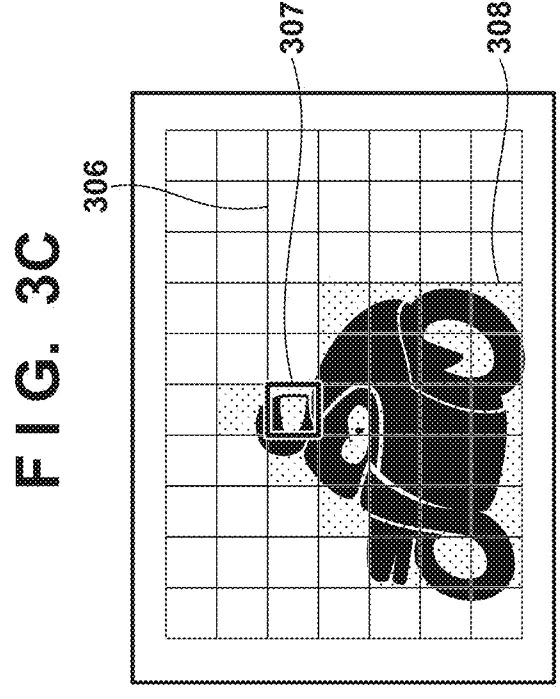
FIGS. 3A to 3D are diagrams illustrating a method for detecting a subject vector according to the embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that the following embodiment will describe, as an example, a case where an interchangeable lens-type digital camera is used as the image capturing apparatus. However, the present invention can be applied in any electronic device having an image capturing function. Examples of such an electronic device include video cameras, computer devices (personal computers, tablet computers, media players, PDAs, and the like), mobile phones, smartphones, game consoles, robots, drones, and dashboard cameras. These are merely examples, however, and the present invention can be applied in other electronic devices as well. The control apparatus according to the present embodiment is also configured to include some of the constituent elements of the image capturing apparatus. The control apparatus may be constituted by parts of the configuration the main body of the image capturing apparatus, or may be constituted by parts of the configuration of the interchangeable lens.

Configuration of Digital Camera

An example of the configuration of a digital camera 10 according to the present embodiment will be described with reference to FIG. 1. The digital camera 10 according to the present embodiment includes a body 100, and a lens unit 200 that can be attached to and detached from the body 100. The body 100 and the lens unit 200 are connected through mounts that mechanically attach the body and lens unit to each other in a removable manner. The mount provided in the lens unit 200 and the mount provided in the body 100 are provided with terminals configured to make contact with each other when the lens unit 200 is mounted to the body 100. The terminals includes a terminal for supplying power from the body 100 to the lens unit 200, a terminal for communication between a camera-side communication unit 135 and a lens-side communication unit 128, and the like.

The lens unit 200 includes an image capturing optical system (or an image capturing lens) 150 that generates an optical image of a subject on an image capturing plane of an image sensor 106 provided in the body 100. The image capturing optical system 150 includes a plurality of optical lenses, including movable lenses, and an aperture stop 104. For the sake of simplicity, FIG. 1 illustrates only a zoom lens 101, an image blur correction lens 102, and a focus lens 103, which are the movable lenses among the optical lenses. Note that each of these movable lenses may actually be constituted by a plurality of lenses.

The zoom lens 101 is driven in an optical axis direction by a zoom lens driving unit 124, and changes the focal length (angle of view) of the image capturing optical system 150. The image blur correction lens 102 can be moved in a direction perpendicular to the optical axis by a correction lens driving unit 122, and optically corrects (suppresses) image blur and the like produced by motion of the digital camera 10. The focus lens 103 is driven in the optical axis direction by a focus lens driving unit 121, and changes the focal distance of the image capturing optical system 150. The size of the opening in the aperture stop 104 is controlled by an aperture driving unit 120, which adjusts the amount of light entering the body 100 from the image capturing optical system 150.

A lens control unit 160 includes, for example, one or more processors capable of executing programs. The one or more processors may be at least one of a CPU, an MPU, a microprocessor, or the like. The lens control unit 160 controls the operations of the lens unit 200 by loading a program stored in a ROM 141 into a RAM 142 and executing the program. The lens control unit 160 also controls operations of the lens unit 200, outputs information on the lens unit 200 to a camera control unit 115, and the like in response to instructions, requests, and the like from the camera control unit 115.

In FIG. 1, the function blocks indicated inside the lens control unit 160 schematically indicate various functions realized by the lens control unit 160 executing programs. As such, operations performed by the function blocks within the lens control unit 160 according to the present embodiment are actually performed by the lens control unit 160. A lens-side motion detection unit 125, a lens-side anti-vibration control unit 126, and a lens information management unit 129, which are implemented in the lens control unit 160, will be described later.

The ROM 141 is rewritable non-volatile memory, and stores programs executed by the lens control unit 160, information and setting values of the lens unit 200, and the like. The RAM 142 is used to load programs to be executed by the lens control unit 160, temporarily store information on the lens unit 200, and the like. Note that at least one of the ROM 141 and the RAM 142 may be integrated with the lens control unit 160.

A shutter 105 is, for example, a mechanical focal plane shutter. Note that an electronic shutter may be used instead of or in addition to the shutter 105. "Electronic shutter" refers to a shutter operation realized by controlling the operations of the image sensor 106.

The image sensor 106 may be a publicly-known CCD or CMOS color image sensor having, for example, a primary color Bayer array color filter. The image sensor 106 includes a pixel array, in which a plurality of pixels are arranged two-dimensionally, and peripheral circuitry for reading out signals from the pixels. Each pixel accumulates a charge corresponding to an amount of incident light through photoelectric conversion. By reading out, from each pixel, a signal having a voltage corresponding to the charge amount accumulated during an exposure period, a group of pixel signals (analog image signals) representing a subject image formed on the image capturing plane is obtained.

The image sensor 106 according to the present embodiment is also configured to be capable of moving in directions perpendicular to the optical axis of the image capturing optical system 150. The position of the image sensor 106 is controlled by a sensor driving unit 130. In this manner, the digital camera 10 according to the present embodiment has an optical image blur correction function in both the lens unit 200 and the body 100.

An AD converter 107 applies noise removal processing, gain adjustment processing, and AD conversion processing to the analog image signal read out from the image sensor 106, and generates a digital image signal (image data). The AD converter 107 outputs the digital image data to an image processing circuit 109. Note that the AD converter 107 may be provided in the image sensor 106.

A timing generator 108 supplies signals for controlling the timing of operations to the image sensor 106 and the AD converter 107 in response to instructions from the camera control unit 115.

The image processing circuit 109 generates signals and image data for different purposes, obtains and/or generates various types of information, and the like by applying predetermined image processing to the image data output by the AD converter 107. The image processing circuit 109 may be a dedicated hardware circuit, such as an Application Specific Integrated Circuit (ASIC) designed to implement a specific function, for example. Alternatively, the image processing circuit 109 may be constituted by a processor such as a Digital Signal Processor (DSP) or a Graphics Processing Unit (GPU) executing software to implement a specific function. The image processing circuit 109 outputs the obtained or generated information, data, and the like to the camera control unit 115, a RAM 110, or the like, according to the purpose of use.

The image processing applied by the image processing circuit 109 can include pre-processing, color interpolation processing, correction processing, detection processing, data processing, evaluation value calculation processing, special effect processing, and the like, for example. The pre-processing includes signal amplification, reference level adjustment, defective pixel correction, and the like. The color interpolation processing is performed when the image sensor is provided with a color filter, and interpolates the values of color components that are not included in the individual pixel data constituting the image data. Color interpolation processing is also called "demosaicing". The correction processing can include white balance adjustment, tone adjustment, correction of image degradation caused by optical aberrations of an image capturing optical system 150 (image restoration), correction of the effects of vignetting in the image capturing optical system 150, color correction, and the like. The detection processing includes detecting a feature region (e.g., a face region or a human body region) or motion in such an area, processing for recognizing a person, or the like. The data processing can include cropping a region (trimming), combining, scaling, encoding and decoding, and header information generation (data file generation). The generation of display image data (including image data for live view displays), recording image data, and the like is also included in the data processing. The evaluation value calculation processing can include processing such as generating signals, evaluation values, and the like used in automatic focus detection (AF), generating evaluation values used in automatic exposure control (AE), and the like. The special effect processing includes adding bokeh effects, changing color tones, relighting processing, and the like.

Note that these are merely examples of the processing that can be applied by the image processing circuit 109, and the processing applied by the image processing circuit 109 is not limited thereto. Additionally, some of the image processing mentioned here may be executed by signal processing circuitry built into the image sensor 106, or by the camera control unit 115.

The camera control unit 115 includes, for example, one or more processors capable of executing programs. The one or more processors may be at least one of a CPU, an MPU, a microprocessor, or the like. The camera control unit 115 realizes the functions of the digital camera 10 by loading programs stored in a ROM 113 into the RAM 110 and executing the programs to control the operations of the body 100 and the lens unit 200. The camera control unit 115 controls the operations of the lens unit 200 through communication with the lens control unit 160. In FIG. 1, the function blocks indicated inside the camera control unit 115 schematically indicate various functions realized by the camera control unit 115 executing programs. As such, the operations of the function blocks in the camera control unit 115 as described herein are actually performed by the camera control unit 115.

The ROM 113 is a rewritable non-volatile memory, and stores programs executed by the camera control unit 115, various types of setting values for the digital camera 10, GUI data, and the like. The RAM 110 is used to load programs executed by the camera control unit 115, temporarily store data to be processed by the image processing circuit 109, intermediate data, and data resulting from processing, and the like. The RAM 110 is also used as a buffer memory for image data, a video memory for a display unit 111, and the like.

The display unit 111 is provided in a surface of a housing of the digital camera 10, for example, and displays a live view image, information of the digital camera, information on image capturing scenes, menu screens, and the like. The display unit 111 may be a touchscreen.

"Operating unit 114" is a collective name for input devices (buttons, switches, dials, and the like) provided for a photographer to input various types of instructions to the digital camera 10. The input devices constituting the operating unit 114 are named according to the functions assigned thereto. For example, the operating unit 114 includes a release switch, a moving image recording switch, a shooting mode selection dial for selecting a shooting mode, a menu button, a directional key, an OK key, and the like. The release switch is a switch for recording a still image, and the camera control unit 115 recognizes the release switch being in a half-pressed state as a shooting preparation instruction, and the release switch being in a fully-pressed state as a shooting start instruction. Additionally, the camera control unit 115 recognizes the moving image recording switch being pressed while in a shooting standby state as a moving image recording start instruction, and recognizes the moving image recording switch being pressed while recording a moving image as a recording stop instruction. Note that the functions assigned to the same input device may be variable.

Upon detecting an operation made on the operating unit 114, the camera control unit 115 executes operations according to the detected operation. For example, when an operation for changing the angle of view of the lens unit 200 is detected, the camera control unit 115 periodically transmits an angle of view change instruction to the lens control unit 160 while the operation is being detected. The zoom lens driving unit 124 of the lens control unit 160 drives the zoom lens 101 by a set amount each time the angle of view change instruction is received.

An exposure control unit 138 determines exposure conditions (aperture value, shutter speed (or exposure time), and image capturing sensitivity) based on, for example, AE evaluation values generated by the image processing circuit 109 and the settings of the digital camera (e.g., the image capturing mode). When exposure conditions for capturing a still image have been determined, the exposure control unit 138 outputs the shutter speed to a shutter driving unit 136, and the aperture value to the lens control unit 160, respectively. Additionally, when the exposure conditions for shooting a moving image have been determined, the exposure control unit 138 outputs an exposure time to the timing generator 108. When the aperture value is changed, the exposure control unit 138 outputs the aperture value to the lens control unit 160. The exposure control unit 138 outputs the image capturing sensitivity to the image sensor 106 or the image processing circuit 109. The aperture driving unit 120 of the lens control unit 160 drives the aperture stop 104 in accordance with the aperture value received from the camera control unit 115.

A focus lens control unit 139 determines a driving amount and a driving direction for moving the focus lens 103 from a current focus lens position to a target focus lens position based on, for example, an AF evaluation value generated by the image processing circuit 109. If the AF evaluation value is a contrast evaluation value, the focus lens control unit 139 determines the driving amount and the driving direction using a focus lens position at which the evaluation value is highest as the target position. If the AF evaluation value is a defocus amount, the focus lens control unit 139 converts the defocus amount into a driving amount and a driving direction. The focus lens control unit 139 sends the determined driving amount and driving direction to the lens control unit 160. The focus lens driving unit 121 of the lens control unit 160 drives the focus lens 103 in accordance with the driving amount and driving direction received from the camera control unit 115.

Functional blocks related to image blur correction will be described hereinafter. The digital camera 10 performs both correction of image blur (hand shake) produced by movement of the body 100 and the lens unit 200, and correction of image blur (subject blur) produced by motion of the subject during the exposure period.

A camera-side motion detection unit 134 detects motion of the body 100 and outputs a signal based on the detected motion to a camera-side anti-vibration control unit 133. The lens-side motion detection unit 125 detects motion of the lens unit 200 and outputs a signal based on the detected motion to the lens-side anti-vibration control unit 126. The camera-side motion detection unit 134 and the lens-side motion detection unit 125 may each be, for example, a gyro sensor that outputs a signal based on an angular velocity about each of axes of a Cartesian coordinate system, a combination of a gyro sensor and an accelerometer that outputs a signal based on an acceleration along each axial direction of the Cartesian coordinate system, and the like.

Although the body 100 and the lens unit 200 have separate motion detection units in the present embodiment, a motion detection unit may be provided in only one of the body 100 and the lens unit 200. For example, if the lens unit 200 does not have a motion detection unit, the output signal of the motion detection unit provided in the body 100 may be sent to both the camera-side anti-vibration control unit 133 and the lens-side anti-vibration control unit 126.

A sensor position detection unit 132 detects the current position of the image sensor 106. The current position may be a relative displacement with respect to a reference position, for example. The position when the center of the pixel array of the image sensor 106 is orthogonal to the optical axis can be taken as the reference position. Note that the reference position may be set based on another publicly-known method. The displacement may be a displacement in two directions parallel to the short side and the long side, respectively, of the image sensor 106.

The camera-side anti-vibration control unit 133 determines a correction amount by which to move the image sensor 106 to cancel out the motion detected by the camera-side motion detection unit 134. Note that the camera-side anti-vibration control unit 133 determines the correction amount within a range that does not exceed a maximum movement amount in each direction with respect to the reference position. The camera-side anti-vibration control unit 133 then corrects image blur by moving the image sensor 106 (changing the shooting angle) through the sensor driving unit 130 in accordance with the determined correction amount.

A correction lens position detection unit 123 detects the current position of the image blur correction lens 102. The current position may be a relative displacement with respect to a reference position, for example. The position when the center of the image blur correction lens 102 is orthogonal to the optical axis can be taken as the reference position. Note that the reference position may be set based on another publicly-known method. The displacement may be a displacement in two directions parallel to the short side and the long side, respectively, of the image sensor.

The lens-side anti-vibration control unit 126 determines a correction amount by which to move the image blur correction lens 102 to cancel out the motion detected by the lens-side motion detection unit 125. Note that the lens-side anti-vibration control unit 126 determines the correction amount within a range that does not exceed a maximum movement amount in each direction with respect to the reference position. The lens-side anti-vibration control unit 126 then corrects image blur by moving the image blur correction lens 102 (changing the shooting angle) through the correction lens driving unit 122 in accordance with the determined correction amount.

The image blur correction described here may be performed in the body 100, the lens unit 200, or both. When image blur correction is performed in both the body 100 and the lens unit 200, for example, a movement amount exceeding the maximum movement amount of one of the elements is compensated for by the other. Alternatively, the necessary movement amount may be allocated to the body 100 and the lens unit 200 at a predetermined ratio. Or, the blur to be cancelled by the body 100 and the lens unit 200 may be distributed therebetween according to the components of the blur.

Electronic image blur correction can be performed instead of or in addition to the optical image blur correction that moves an anti-vibration member (here, the image blur correction lens 102, the image sensor 106, or both). Electronic image blur correction can be realized by moving the position at which an effective region is cropped from a captured image so as to cancel out the motion of the digital camera 10. For example, the movement amount of the image sensor 106 determined by the camera-side anti-vibration control unit 133 can be converted into a movement amount on the pixel array, and the cropping position can be changed (the shooting angle can be changed). In the present embodiment, an image composition processing unit 131 calculates the movement amount and performs the cropping.

A motion vector detection unit 143 detects motion between frames as a motion vector, using template matching, for example. Although the motion vector detection unit 143 can also be used to detect motion in the digital camera 10, the motion vector detection unit 143 is mainly used to detect subject blur in the present embodiment. A method for detecting subject blur will be described later. When detecting a motion vector of a frame as a whole, electronic image blur correction can be performed by changing the cropping position based on the movement amount expressed by the motion vector.

A camera information management unit 137 is used for storing information pertaining to the body 100, information obtained by the body 100, and the like, such as setting information of the body 100, the current position of the image sensor 106, a driving limit (the maximum movement amount in each direction), a subject blur correction amount, and the like.

The lens information management unit 129 is used for storing information pertaining to the lens unit 200, information obtained by the lens unit 200, and the like, such as the optical characteristics, the current position, a driving limit (the maximum movement amount), and the like of the image blur correction lens 102.

Configurations Related to Image Blur Correction

The configurations of the lens unit 200 and the body 100 related to image blur correction will be described in further detail with reference to FIG. 2. In FIG. 2, the function blocks indicated inside the lens-side anti-vibration control unit 126 schematically indicate various functions realized by the lens control unit 160 executing programs. As such, operations performed by the function blocks within the lens-side anti-vibration control unit 126 described hereinafter are actually performed by the lens control unit 160. Likewise, operations performed by the function blocks denoted within the camera-side anti-vibration control unit 133 are actually performed by the camera control unit 115. The camera control unit 115 and the lens control unit 160 operate in tandem to function as a control unit that performs image blur correction control.

The configuration of the lens unit 200 related to image blur correction will be described first. A lens-side integration unit 151 integrates the angular velocity signals output by the lens-side motion detection unit 125 to convert the angular velocity signals into angle signals.

A lens-side blur correction amount determination unit 152 determines a correction amount corresponding to a movement amount of the image blur correction lens 102 required to correct the image blur, based on the angle signals output by the lens-side integration unit 151.

An adder 153 applies (adds), to the correction amount determined by the lens-side blur correction amount determination unit 152, the subject blur correction amount determined by the body 100 and obtained by a subject blur correction amount obtainment unit 157, and a subject tracking amount determined by the body 100 and obtained by a subject tracking amount obtainment unit 158. The methods for determining the subject blur correction amount and the subject tracking amount will be described later.

A lens-side ratio determination unit 154 determines a ratio of the movement amount to be handled by the lens unit 200, assuming the total movement amount required to correct hand shake and subject blur, and to perform subject tracking, is 100%. Note that when using only one of the lens unit 200 and the body 100, the ratio determined by the lens-side ratio determination unit 154 is 100% or 0%.

Whether the image blur correction is to be performed by the lens unit 200, the body 100, or both can be determined according to any desired conditions. For example, the image blur correction may be performed according to user settings, or may be determined to be performed by both the body 100 and the lens unit 200 if the total movement amount of the image blur correction lens 102 or the image sensor 106 exceeds the maximum movement amount. The lens-side ratio determination unit 154 can make this determination based on information stored in the camera information management unit 137 and the lens information management unit 129.

A lens-side driving range limiting unit 155 limits the correction amount such that the image blur correction lens 102 is driven within a range that does not exceed the maximum movement amount. A correction lens controller unit 156 controls the position of the image blur correction lens 102 through the correction lens driving unit 122. The correction lens controller unit 156 performs feedback control based on the current position of the image blur correction lens 102 as detected by the correction lens position detection unit 123, to move the image blur correction lens 102 to the target position based on the movement amount.

The configuration of the body 100 related to image blur correction will be described next. A camera-side integration unit 161 integrates the angular velocity signals output by the camera-side motion detection unit 134 to convert the angular velocity signals into angle signals.

A camera-side blur correction amount determination unit 162 determines a correction amount corresponding to a movement amount of the image sensor 106 required to correct the image blur, based on the angle signals output by the camera-side integration unit 161. A subject vector detection unit 163 detects a subject vector, which expresses subject blur, based on the motion vector between frames detected by the motion vector detection unit 143. Operations for detecting the subject vector will be described in detail later. A subject blur correction amount determination unit 164 determines a correction amount for correcting the subject blur, based on the subject vector.

A subject reference position determination unit 169 determines whether the entire body of the subject is within the shooting angle based on information from an object recognition unit 140, and determines a subject tracking detection position. The operations of the subject reference position determination unit 169 will be described in detail later. A subject target position determination unit 170 determines a predetermined position within the shooting angle as a position for tracking the subject, based on information from the subject reference position determination unit 169. The operations of the subject target position determination unit 170 will be described in detail later.

An adder 171 adds the subject blur correction amount for subject blur correction, determined by the subject blur correction amount determination unit 164, to the subject tracking amount for tracking the subject at a desired predetermined position within the shooting angle, determined by the subject target position determination unit 170. An adder 165 adds the correction amount for correcting hand shake, determined by the camera-side blur correction amount determination unit 162, to the result obtained by the adder 171 adding the subject blur correction amount and the subject tracking amount.

A camera-side ratio determination unit 166 determines a ratio of the movement amount to be handled by the body 100, assuming the total movement amount required to correct hand shake and subject blur, and to perform subject tracking, is 100%. Note that when using only one of the lens unit 200 and the body 100, the ratio determined by the camera-side ratio determination unit 166 is 100% or 0%. The camera-side ratio determination unit 166 can make this determination based on information stored in the camera information management unit 137 and the lens information management unit 129.

A camera-side driving range limiting unit 167 limits the correction amount such that the image sensor 106 is driven within a range that does not exceed the maximum movement amount. A camera-side controller unit 168 controls the position of the image sensor 106 through the sensor driving unit 130. The camera-side controller unit 168 performs feedback control based on the current position of the image sensor 106 as detected by the sensor position detection unit 132, to move the image sensor 106 to the target position based on the movement amount.

Subject Vector Detection

The detection of the subject vector by the subject vector detection unit 163 will be described here with reference to FIGS. 3A to 3D. Note that "subject" refers to an object present closer to the photographer than the background, and is generally a person or the like. Here, it is assumed that a region moving between frames is detected as a subject region, and a vector expressing the motion of the subject region is detected as the subject vector.

First, the motion vector detection unit 143 detects a motion vector with respect to a reference frame, for each of regions set in a target frame. FIG. 3A illustrates an example of setting the regions for detecting the motion vectors in the target frame. Here, to lighten the processing load, a motion vector detection range 301 can be set in a part of the target frame. The motion vector detection unit 143 detects a motion vector for each of regions into which the detection range 301 is divided. The detection of the motion vector can be performed, for example, through template matching, in which an image of each region is used as a template, and the region having the highest correlation within the reference frame is detected as a destination region.

FIG. 3B schematically illustrates a histogram of the magnitudes of the motion vectors detected for each of the regions in the detection range 301 illustrated in FIG. 3A. The subject vector detection unit 163 detects the subject vector based on this histogram. The subject vector detection unit 163 converts the angle signal output by the camera-side integration unit 161 or the lens-side integration unit 151 into a movement amount on the image capturing plane. The conversion can be performed, for example, using the focal length of the image capturing optical system 150, an image capturing time difference between the target frame and a reference frame or the framerates thereof, or a pixel pitch of the image sensor 106.

In the camera-side motion detection unit 134 or the lens-side motion detection unit 125, the origin of the output varies due to external disturbances such as temperature drift (an offset phenomenon). Accordingly, the subject vector detection unit 163 uses a predetermined range centered on a movement amount 302 as a background determination region 303. The subject vector detection unit 163 then determines that a motion vector of a magnitude that is within the background determination region 303 is a background vector 304. On the other hand, the subject vector detection unit 163 determines that a motion vector of a magnitude that is not within the background determination region 303 is a subject vector 305. The subject vector 305 can be used to correct subject blur, and the background vector 304 can be used to correct hand shake.

Although the foregoing example describes a method in which motion vectors are separated into the subject vector 305 and the background vector 304 based on the angular velocity signals (or the angle signals), other methods may be used instead. If, for example, the digital camera 10 or the subject moves only a small amount, it is difficult to separate the subject vector and the background vector using a method based on the angular velocity or angle.

Using subject distance information, for example, makes it possible to separate the motion vectors into the subject vector and the background vector even when the digital camera 10 or the subject moves only a small amount. The subject distance information may be, for example, a depth map indicating the subject distance for each region into which the image capturing range has been divided, or for each pixel. An example of separating the subject region and the background region based on an AF frame having the highest degree of focus will be described here as a more convenient method. In FIG. 3C, 306 indicates a plurality of AF frames (focus detection regions) that can be set by the digital camera. 307 indicates the AF frame, among the plurality of AF frames 306, having the highest degree of focus. In this case, the subject vector detection unit 163 sets a subject region 308 based on the subject distance of the AF frame 307, takes the motion vector detected in the subject region 308 as the subject vector, and takes the motion vectors detected in other regions as background vectors. For example, the subject vector detection unit 163 can set an AF frame for which the difference in the degree of focus from the AF frame 307 is within a predetermined threshold range, or an AF frame having a depth of field within a predetermined threshold range relative to a subject depth of field of the AF frame 307 (e.g., ±2), as the subject region 308.

Note that the above-described method that uses the angular velocity signals (or angle signals) may be used in conjunction with the method that uses the subject distance information. In this case, a representative value (an average value, a mode value, or the like) of vectors of the same type determined through the respective methods may be used. The subject region may also be detected based on machine learning, a publicly-known feature region detection technique, or the like, and the motion vector of the subject region may be detected as subject blur. FIG. 3D schematically illustrates a state in which a predetermined subject region 309 (here, the face region of a human) has been detected. The subject blur can be detected using an evaluation image shot for the live view display.

Calculation of Movement Amount on Image Capturing Plane

Figure 4:
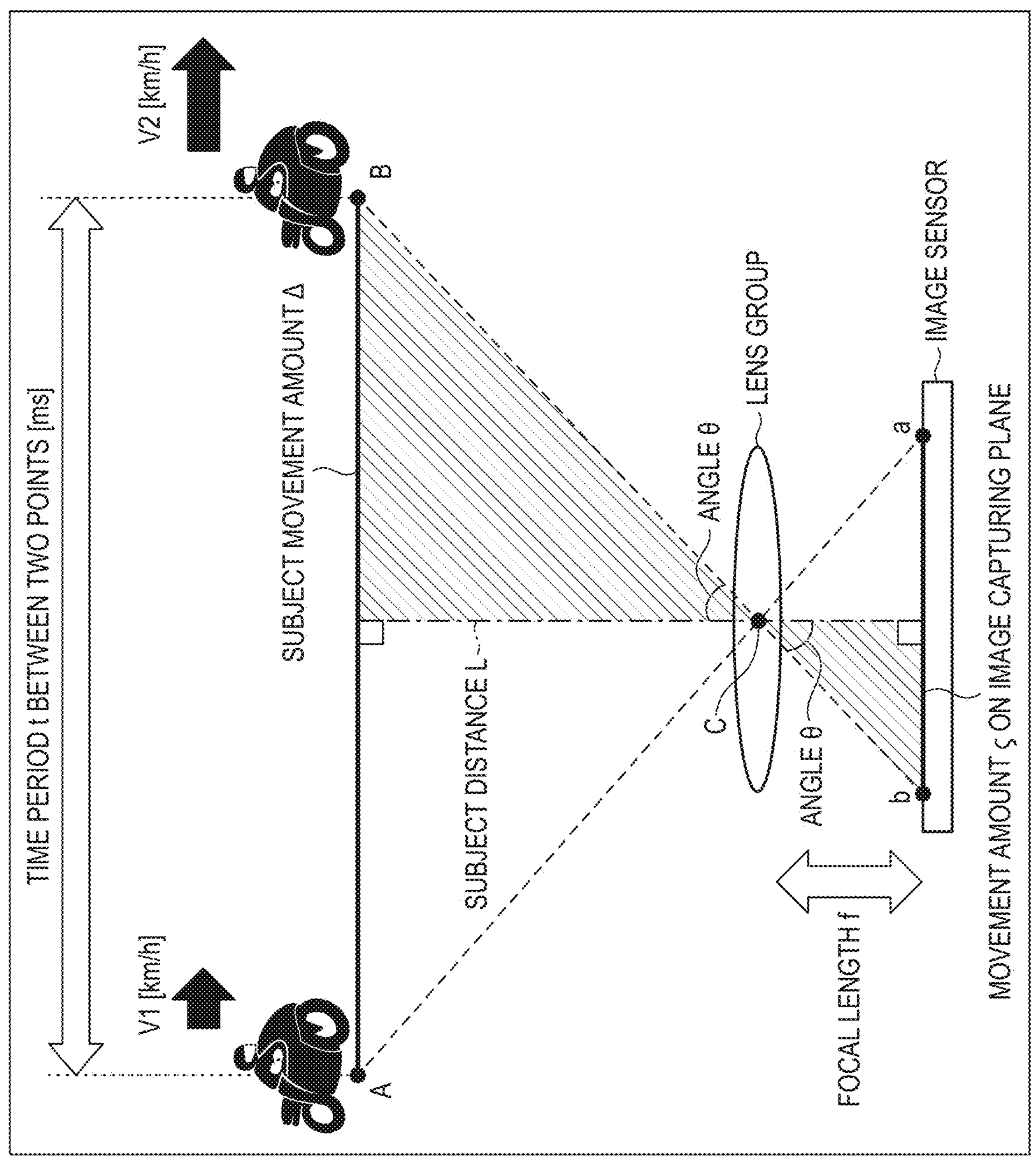
FIG. 4 is a diagram illustrating an example of a method for detecting motion of a subject, according to the embodiment.

FIG. 4 schematically illustrates a case where a subject moving in a direction parallel to the image capturing plane has been detected by comparing two consecutive pieces of distance information. For example, assuming that the distance information is obtained in a 1/30-second cycle, a time t required for the subject to move from position A to B is 33.3 ms.

In FIG. 4, assuming that a principle point (a single point) of the image capturing optical system 150 is C, a triangle ABC in which the distance between positions A and B (a subject movement amount Δ) represents one side is similar to a triangle abC in which a movement amount δ of the subject on the image capturing plane represents one side. When the subject distance is represented by L and the focal length of the image capturing optical system 150 is represented by f, the ratio between the triangle ABC and the triangle abC is L−f:f. Accordingly, the movement amount can be converted into a movement amount on the image capturing plane as "movement amount δ of the subject on the image capturing plane=subject movement amount Δ×f/L−f". This relationship holds even when the speed of the subject differs between point A and point B.

Treating the movement amount on the image capturing plane as a motion vector in the horizontal direction, for example, makes it possible to convert into an angular velocity by reversing the procedure for converting the motion of the digital camera 10 into the movement amount on the image capturing plane. Note that the method described here is merely an example, and the motion of the subject may be detected through another method, without using the image sensor 106.

Example of Subject Tracking

An example of subject tracking according to the present embodiment will be described next with reference to FIGS.

Figure 5A:
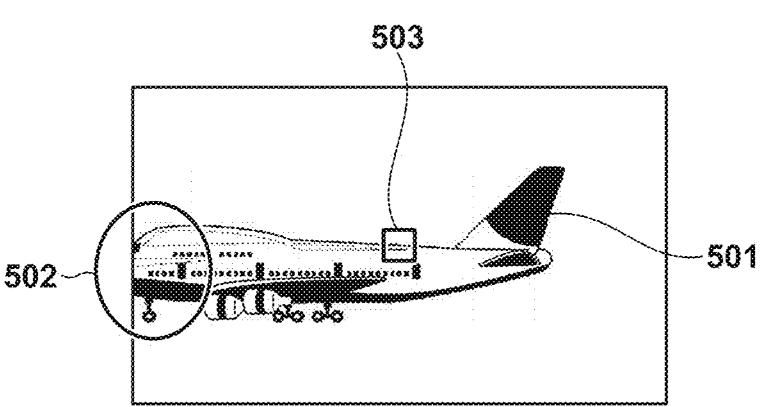
FIGS. 5A to 5C are diagrams illustrating an example of a composition after tracking control for a subject, according to the embodiment.
Figure 5B:
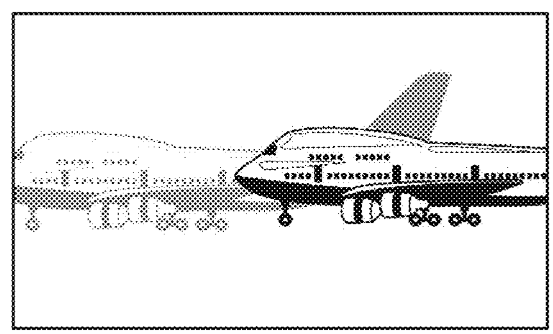
Figure 5C:
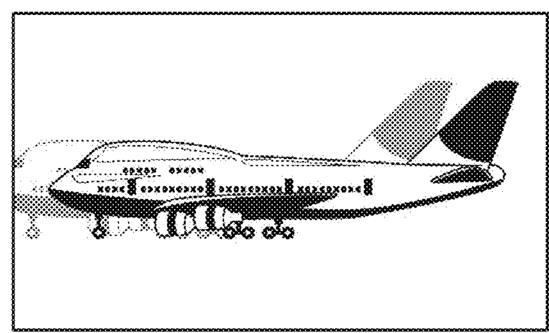

5A to 5C. FIG. 5A schematically illustrates a shooting scene in which a subject 501, which is a moving object, is being followed during panning. The photographer is not following the subject in a stable manner, and thus a local constituent in the subject 501 (e.g., the cockpit) is about to exit the frame from the shooting angle. When causing a tracking detection position 502 to track a tracking target position 503 within the subject 501, performing correction such that the tracking detection position 502 becomes the tracking target position 503 without taking into account the entire body of the subject with respect to the shooting angle, the composition will be as that schematically illustrated in FIG. 5B. In this case, the local constituent of the subject 501 that was about to exit the frame in FIG. 5A (e.g., the cockpit) can be kept within the shooting angle. However, in FIG. 5B, another local constituent of the subject 501 that had been within the shooting angle in FIG. 5A (e.g., the tail) has now exited the frame from the shooting angle due to the correction. The image at the shooting angle illustrated in FIG. 5A has been shot under shooting conditions in which the entire body of the subject 501 is within the shooting angle, and thus the composition after the tracking control expected by the photographer is as illustrated in FIG. 5C.

Accordingly, in the present embodiment, the subject target position determination unit 170 determines the tracking target position taking into account not only the subject 501 or local constituents that are part of the subject 501, but also the entire body of the subject.

Figure 6A:
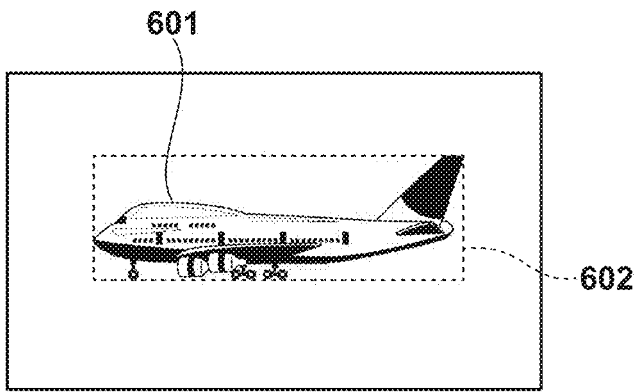
FIGS. 6A to 6C are diagrams illustrating a method for determining an overall body size of a subject within a shooting angle, according to the embodiment.
Figure 6B:
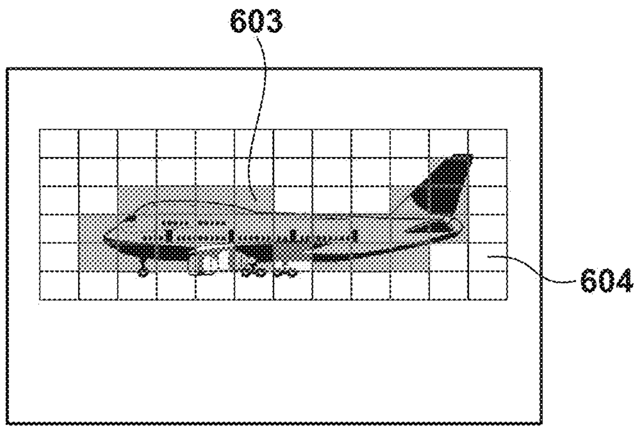
Figure 6C:
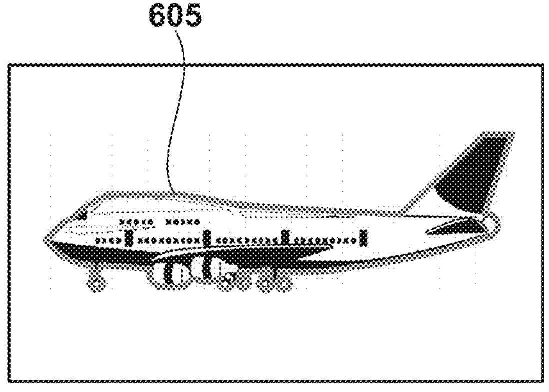

An example of determining whether the entire body of the subject falls within (included in) the shooting angle will be described next with reference to FIGS. 6A to 6C. Note that the determination as to whether the entire body of a subject 601 falls within the shooting angle is made by the subject reference position determination unit 169. The determination can be made through a variety of methods. In the example illustrated in FIG. 6A, the entire body of the subject 601 is detected by the object recognition unit 140 based on machine learning such as deep learning, a publicly-known feature region detection technique, or the like. For example, whether the entire body of the subject 601 falls within the shooting angle may be determined by detecting the subject 601 or regions of local constituents 602 constituting the subject 601 (e.g., the cockpit or the tail) using a trained model trained through supervised learning. FIG. 6B illustrates an example of a case where motion vectors are used. The subject reference position determination unit 169 determines whether a subject vector frame is present as a single entity based on a distribution of vector frames 603 determined as subject vectors and vector frames 604 determined as background vectors by the subject vector detection unit 163. The entire body of the subject 601 can be determined to fall within the shooting angle when the subject vector frame is present as a single entity. Additionally, as described above, the entire body of the subject may be determined to fall within the shooting angle by detecting the subject vector based on the subject depth, the subject distance, or the like using a depth map, a LiDAR sensor, or the like instead of the camera-side motion detection unit 134.

Additionally, the subject distance may be used in conjunction with the camera-side motion detection unit 134. As illustrated in FIG. 6C, whether the subject 601 falls within the shooting angle may be determined by extracting a contour (edge) 605 of the subject. An image filter that applies differentiation for the evaluation image, such as a Laplacian filter, may be used to detect the contour of the subject. Additionally, the methods of FIGS. 6A to 6C may be used in conjunction to determine whether the subject 601 falls within the shooting angle.

A method for determining the target position in the image, for tracking the subject, will be described next with reference to FIGS. 7A to 7C. Specifically, a method will be described in which the subject target position determination unit 170 determines the target position for tracking the subject when the subject reference position determination unit 169 has determined that the entire body of the subject falls within the shooting angle.

Figure 7A:
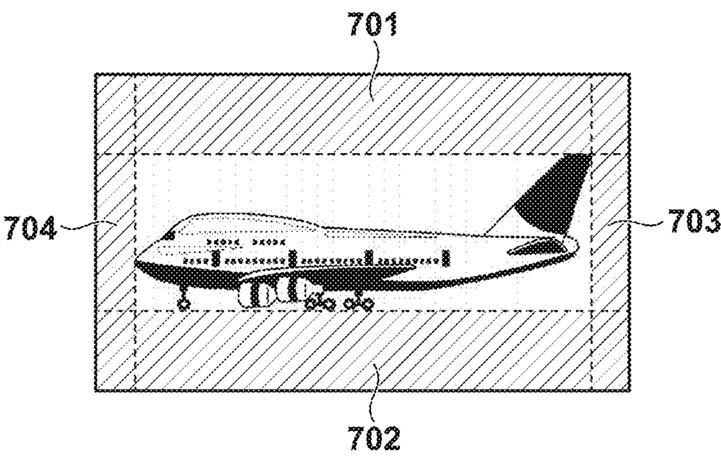
FIGS. 7A to 7C are diagrams illustrating a subject tracking control method when the entire body of a subject falls within the shooting angle, according to the embodiment.

FIG. 7A schematically illustrates a composition when the subject target position determination unit 170 controls the tracking such that the entire body of the subject is in an even position in the shooting angle. For example, with respect to the horizontal direction of the evaluation image in FIG. 7A, the subject target position determination unit 170 determines the X coordinate of the tracking target position at the position where a right margin 703 and a left margin 704 are equal. Next, with respect to the vertical direction of the evaluation image, the subject target position determination unit 170 determines the Y coordinate of the tracking target position at the position where an upper margin 701 and a lower margin 702 are equal. In other words, FIG. 7A illustrates a composition in which the tracking is controlled such that the entire body of the subject is in a position equivalent to the position in the evaluation image.

Figure 7B:
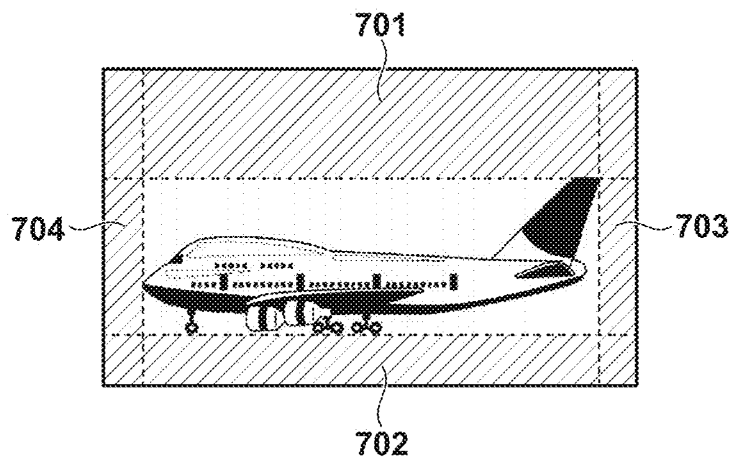

FIG. 7B schematically illustrates a composition when the subject target position determination unit 170 determines the X coordinate of the tracking target position such that the direction of travel of the subject is arranged so as to be even in the shooting angle. The difference from FIG. 7A is that a large margin is provided in either the upper or lower direction of the shooting angle to create a composition that captures elements other than the subject, such as runway approach lights in a scene where an airplane is taking off from an airport at night, for example. In this case, the subject target position determination unit 170 determines the X coordinate of the tracking target position such that the right margin 703 and the left margin 704, which correspond to the direction of travel of the subject, are equal, in the same manner as in FIG. 7A. On the other hand, unlike FIG. 7A, the subject target position determination unit 170 determines the Y coordinate position of the tracking target position so as to be closer to the lower margin 702 for the subject. Alternatively, the subject target position determination unit 170 may determine the Y coordinate position so as to be closer to the upper margin 701 of the subject.

Figure 7C:
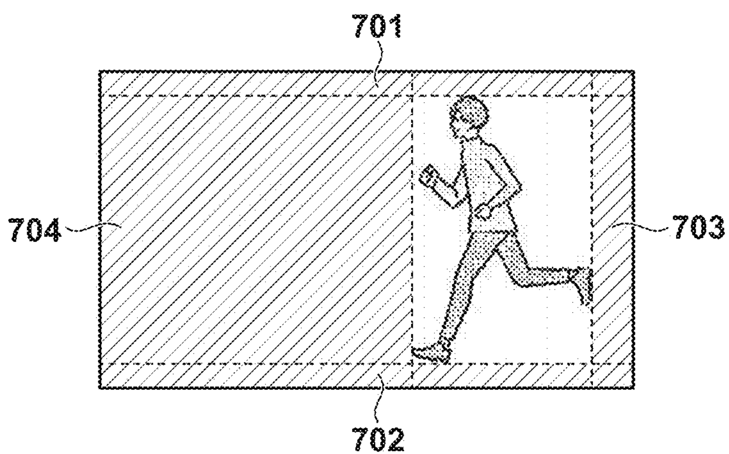

In the example illustrated in FIG. 7C, the type of the subject is different from that in FIGS. 7A and 7B, and a person is being tracked. When capturing a person, the margin is generally broad in the horizontal direction with respect to the shooting angle. In such a case, the subject target position determination unit 170 determines the Y coordinate of the tracking target position such that the position in the vertical direction of the evaluation image is even, and determines the X coordinate so as to be closer to the right margin 703 or closer to the left margin 704. With the airplane illustrated in FIG. 7B and the person illustrated in FIG. 7C, where the coordinates that keep the tracking target position even are different, the position may be kept even in the direction in which the horizontal and vertical margins are smaller, according to the type of the subject.

Another method through which the subject target position determination unit 170 determines the target position at which the subject is to be tracked will be described next with reference to FIGS. 8A to 8D. In the method illustrated in FIGS. 8A to 8D, the target position at which the subject is to be tracked is determined when the entire body of the subject is determined not to fit within the shooting angle through the methods described above with reference to FIGS. 6A to 6C.

Figure 8A:
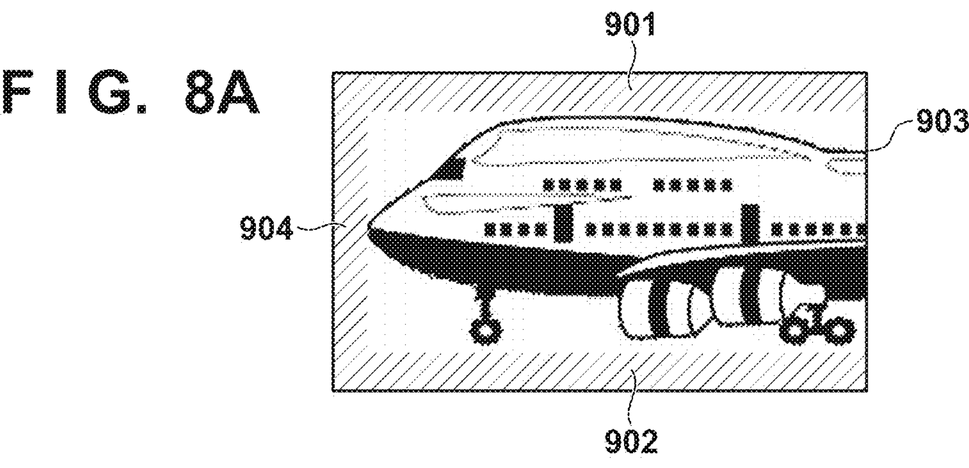
FIGS. 8A to 8D are diagrams illustrating a subject tracking control method when the entire body of a subject does not fall within the shooting angle, according to the embodiment.

FIG. 8A schematically illustrates a composition in which the photographer is following a subject at a long focal length in a stable manner. The photographer is shooting at a shooting angle (focal length) at which the entire body of the subject does not fit, an upper margin 901 and a lower margin 902 are present, but a right margin 903 is not present. On the other hand, a left margin 904 has at least a predetermined value's worth of space. If this state remains stable for at least a predetermined number of frames, tracking control is not performed. In this composition, the positions of the local constituents of the subject (e.g., the cockpit) remain stable.

Figure 8B:
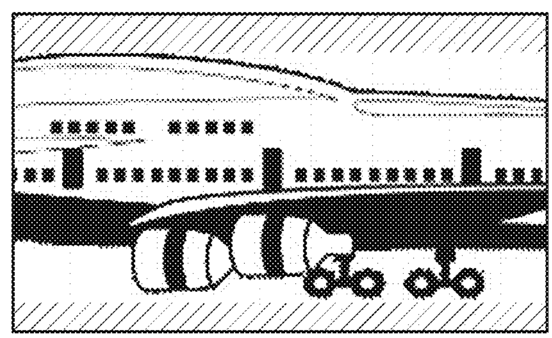
Figure 8C:
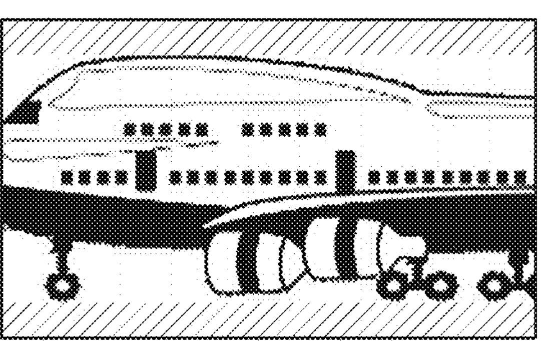
Figure 8D:
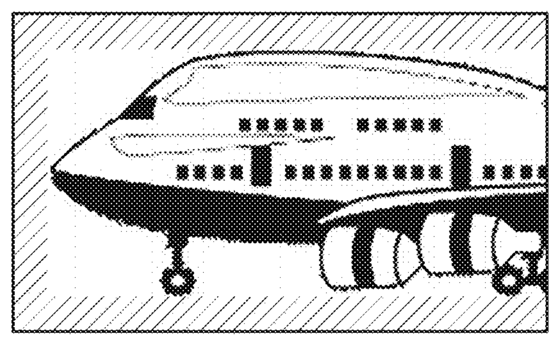

FIG. 8B schematically illustrates a composition in which the photographer is not following a subject at a long focal length in a stable manner. In this example, the photographer is following the subject with the camera too late, and thus the subject is gradually exiting the frame in the direction of travel of the subject (to the left in the shooting angle). In such a composition, the subject target position determination unit 170 performs tracking control in a direction opposite from the direction of travel of the subject such that the local constituent of the subject (e.g., the cockpit) falls within the shooting angle. FIG. 8C illustrates a composition in which a predetermined amount of driving for tracking is performed in the opposite direction (to the right in the shooting angle) from the direction of travel of the subject (to the left in the shooting angle), from the state illustrated in FIG. 8B. Although the local constituent of the subject (e.g., the cockpit) falls within the shooting angle, there is no space in the left margin 904, and the subject cannot be seen. As such, the subject tracking control is performed continuously. Note that the local constituent of the subject to be tracked may be determined in advance. For example, the cockpit of the airplane may be determined in advance as the local constituent to be tracked. In FIG. 8D, the tracking control continues from the state illustrated in FIG. 8C, and the subject continues to be tracked while keeping the left margin 904 at a predetermined value (e.g., 100 pixels).

Series of Operations in Image Blur Correction

A series of operations in the image blur correction according to the present embodiment will be described next with reference to FIG. 9. Note that the series of operations described here is realized by the camera control unit 115 loading a program stored in the ROM 113 or the like into the RAM 110 and executing the program such that the various units within the camera control unit 115 (including the various units of the camera-side anti-vibration control unit 133) function. However, the lens control unit 160 may be realized by executing a program stored in the ROM 141 or the like, or the camera control unit 115 and the lens control unit 160 may be realized in tandem. This processing can also be started when, for example, an image captured by the image sensor 106 (the evaluation image) is loaded into the camera control unit 115. At this time, the image to be loaded is an image captured by the photographer while panning the camera to shoot at least part of a subject that is a moving object.

In step S901, the camera-side motion detection unit 134 (and/or the lens-side motion detection unit 125) detects motion of the digital camera 10 (hand shake) as an angular velocity signal. In step S902, the camera-side blur correction amount determination unit 162 (and/or the lens-side blur correction amount determination unit 152) determines a correction amount (hand shake correction amount) corresponding to a movement amount of the image sensor 106 and the image blur correction lens 102 required to cancel out the motion detected in step S901.

In step S903, the subject vector detection unit 163 detects a subject vector expressing subject blur with respect to the evaluation image, using any of the methods described above with reference to FIGS. 3A to 3D. For example, the subject vector detection unit 163 detects the subject vector based on a histogram of the magnitudes of the motion vectors detected for each of regions. In step S904, the subject blur correction amount determination unit 164 converts the subject vector detected in step S903 into an angular velocity of the subject. The conversion may be performed by reversing the procedure for converting the motion of the digital camera into a movement amount on the image capturing plane, as described with reference to FIG. 4. Note that the angular velocity of the subject is used to predict motion of the subject within the frame. As such, the subject blur correction amount determination unit 164 stores the angular velocity of the subject, obtained for the most recent predetermined number of frames, for example, in the RAM 110.

In step S905, the camera control unit 115 determines whether a tracking control function is active. The setting of the tracking control function may be, for example, a manual setting instructed by the photographer through the operating unit 114, or the tracking state may be detected and set automatically by the camera control unit 115. The sequence moves to step S906 if the camera control unit 115 determines that the tracking control function is active, and to step S912 if not.

In step S906, the subject reference position determination unit 169 detects the entire body of the subject in the evaluation image through the method described above with reference to FIGS. 6A to 6C. The subject reference position determination unit 169 detects a part of the subject or the entire body of the subject based on, for example, machine learning such as deep learning by the object recognition unit 140, a publicly-known feature region detection technique, or the like.

In step S907, the subject reference position determination unit 169 determines whether the entire body of the subject falls within (is included in) the shooting angle based on the result of step S906. The sequence moves to step S908 if the subject reference position determination unit 169 determines that the entire body of the subject falls within the shooting angle, and to step S909 if not.

In step S908, the subject target position determination unit 170 determines the position of the subject (the coordinates of the target position at which the subject is to be tracked) such that the margins in the frame (i.e., the distances from the end portion of the subject to the end portion of the angle of view) are equal (substantially equal) when the entire body of the subject falls within the shooting angle. Note that, as described above with reference to FIGS. 7B and 7C, the subject target position determination unit 170 may conversely assume a composition including elements other than the subject, and may determine coordinates such that the distances of the margins are equal for only the horizontal direction or the vertical direction in the image. For example, the subject target position determination unit 170 can determine the coordinates of the target position such that the distances of the margins (the distance from the end portion of the subject to the end portion of the angle of view) are equal in the direction, among the horizontal direction and the vertical direction, in which an image height of the subject is greater. In the present embodiment, the distances of the margins are approximately equal to achieve a composition in which the subject is positioned at the center of the shooting angle. However, the distances of the margins at both ends of the subject may be different, as long as the subject is within a range at which the composition can be considered to have the subject positioned at the center of the shooting angle. For example, even if the distances of the margins at both ends of the subject are different, those distances may be considered to be substantially equal as long as the distances are within 5% of the effective region in the horizontal direction.

The subject target position determination unit 170 can also determine the coordinates of the target position such that the subject region is closer to either of the end portions of the angle of view in the direction, among the horizontal direction and the vertical direction, in which the distance from the end portion of the subject to the end portion of the angle of view is greater. Alternatively, the subject target position determination unit 170 can determine the coordinates of the target position such that the subject region is closer to either of the end portions of the angle of view in the direction, among the horizontal direction and the vertical direction, in which the image height of the subject is smaller.

For example, when capturing an image with the composition illustrated in FIG. 7B, the subject is captured such that the long side direction of the subject region substantially matches the horizontal direction of the angle of view. Furthermore, the distance from the end portion of the subject to the end portion of the angle of view in the short side direction of the subject region is greater than the distance from the end portion of the subject to the end portion of the angle of view in the long side direction of the subject region. The subject target position determination unit 170 generally sets the distances of the margins in the long side direction relative to the subject region (e.g., from the left end of the subject to the left end of the angle of view, and from the right end of the subject to the right end of the angle of view) to be equal. The subject target position determination unit 170 then sets the distance of one of the margins in the short side direction (e.g., the vertical direction of the angle of view) relative to the subject region (e.g., from the upper end of the subject to the upper end of the angle of view, and from the lower end of the subject to the lower end of the angle of view) to be smaller than the other. Of course, the method is not limited thereto, and the subject target position determination unit 170 can determine the coordinates of the target position such that the subject region is not offset in the horizontal direction of the angle of view but is offset in one direction vertically in the image.

Furthermore, when capturing an image with the composition illustrated in FIG. 7C, the subject is captured such that the long side direction of the subject region substantially matches the vertical direction of the angle of view. Furthermore, the distance from the end portion of the subject to the end portion of the angle of view in the short side direction of the subject region is greater than the distance from the end portion of the subject to the end portion of the angle of view in the long side direction of the subject region. The subject target position determination unit 170 generally sets the distances of the margins in the long side direction relative to the subject region (e.g., from the upper end of the subject to the upper end of the angle of view, and from the lower end of the subject to the lower end of the angle of view) to be equal. The subject target position determination unit 170 also sets the distance of one of the margins in the short side direction (e.g., the horizontal direction of the angle of view) relative to the subject region (e.g., from the left end of the subject to the left end of the angle of view, and from the right end of the subject to the right end of the angle of view) to be smaller than the other. In this case too, the method is not limited thereto, and the subject target position determination unit 170 can determine the coordinates of the target position such that the subject region is not offset in the vertical direction of the image but is offset in one direction horizontally in the image.

In step S909, the subject reference position determination unit 169 determines whether the local constituent of the subject falls within the shooting angle. The sequence moves to step S910 if the subject reference position determination unit 169 determines that the local constituent of the subject falls within the shooting angle, and to step S911 if not. This processing is performed to take into account, for example, a state in which the local constituent of the subject is shot at a full shooting angle at a long focal length. In such a state, a situation where the photographer is following the constituent and a situation where the photographer is not following the constituent (because the long focal length means it is easy for the subject to exit the frame) are both conceivable, and the processing is therefore performed accordingly.

For example, the subject reference position determination unit 169 can determine that a specific local constituent of the subject (e.g., the cockpit) falls within the shooting angle when the local constituent is detected within the shooting angle by the object recognition unit 140. In addition, if the specific local constituent is not detected within the shooting angle (even if a local constituent of the subject which is not to be tracked is detected within the shooting angle), the subject reference position determination unit 169 can determine that the local constituent of the subject does not fall within the shooting angle.

In step S910, the camera-side anti-vibration control unit 133 skips the tracking correction. This is done because the photographer is presumed to be tracking the local constituent of the subject within the shooting angle in a stable manner, even at the shooting angle at a long focal length, and thus assistance from the tracking control is unnecessary. The camera-side anti-vibration control unit 133 may skip the tracking correction when a determination of "yes" is made in step S909 over a predetermined number of frames.

Note that if the local constituent of the subject (e.g., the cockpit) is determined to fall within the shooting angle, the subject target position determination unit 170 may further perform processing that takes the margins into account. For example, the subject target position determination unit 170 determines whether the distance of the margin in the direction of travel of the subject (e.g., from the left end of the subject to the left end of the angle of view) is greater than a predetermined value (e.g., 0). This is done in order to determine whether the subject is being cut off despite the local constituent being included within the shooting angle. The subject target position determination unit 170 may perform the same processing as in S911 when the distance of the margin (e.g., from the left end of the subject to the left end of the angle of view) is not greater than the predetermined value. On the other hand, when the distance of the margin is greater than the predetermined value, the tracking correction may be skipped.

In step S911, the subject target position determination unit 170 performs tracking control until the local constituent of the subject enters the frame at the shooting angle. This is done because the photographer is presumed not to be tracking the local constituent of the subject within the shooting angle in a stable manner at the long focal length, and the local constituent of the subject can be tracked appropriately through the processing performed in this step. For example, the subject target position determination unit 170 changes the position of the subject in a direction opposite from the direction of travel of the subject such that the distance of the margin in the direction of travel of the subject (e.g., from the left end of the subject to the left end of the angle of view) is at least a predetermined threshold.

In step S912, the camera-side anti-vibration control unit 133 determines the image blur correction amount based on the hand shake correction amount, the subject blur correction amount, and the coordinates of the target position at which the subject is to be tracked, determined from steps S901 to S911. In step S913, the camera-side anti-vibration control unit 133 and/or the lens-side anti-vibration control unit 126 drive the image sensor 106 and/or the image blur correction lens 102 as described above, based on this correction amount and the correction amount for hand shake correction. When the processing of step S913 ends, the camera control unit 115 ends the sequence of operations in this processing.

As described above, according to the present embodiment, whether the entirety of a subject is included in a captured image is determined, and when the entirety of the subject is included in the image, a target position for tracking within the image is determined such that the distances of margins of the subject are made equal through first processing. If the entirety of the subject is not included in the image, the target position is determined such that a specific constituent of the subject is included in the image through second processing. In other words, the target position at which the subject is tracked is determined such that the composition is appropriate, according to whether the entirety of the subject is included in the image. This enables tracking control which provides an appropriate composition as expected by the photographer, which makes it possible to provide a high-quality shot image. In other words, a subject which is the target of tracking can be shot appropriately according to the scene. Note that when the entire body of the subject is determined not to fall within the shooting angle in step S907, the angle of view may be expanded (on the wide-angle side) such that the entire body of the subject falls within the shooting angle, after which the sequence may move to step S908. The method for expanding the angle of view may be a method in which the zoom lens 101 is driven to change the focal length of the image capturing optical system 150, or a method in which the cropping size of the effective region is changed. When performing such processing, the entire body of the subject falls within the shooting angle, but the size of the subject image within the effective region changes automatically. As such, a configuration may be employed in which the photographer can select whether to expand the angle of view using the operating unit 114 when the entire body of the subject is determined not to fall within the shooting angle. Additionally, the configuration may be such that when the photographer has made a selection to enable the expansion of the angle of view, the photographer can also select the extent to which the angle of view is to be expanded. When it is necessary to expand the angle of view beyond a maximum value for expansion such that the entire body of the subject falls within the shooting angle, the sequence may move to step S909.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-197588, filed Nov. 21, 2023 which is hereby incorporated by reference herein in its entirety.

What is claimed is:

1. A control apparatus comprising:

one or more processors; and a memory storing instructions which, when the instructions are executed by the one or more processors, cause the control apparatus to function as:

a detection unit configured to detect a region of a subject in an image that has been captured;

a determination unit configured to determine a target position, in the image, of the subject detected, in a case where the subject is tracked; and a control unit configured to change an angle of view for shooting such that a position of the subject in the image becomes the target position, wherein in a case where the entirety of the subject is included in the image captured, the determination unit determines the target position through first processing based on a position of the entirety of the subject, and in a case where the entirety of the subject is not included in the image captured, the determination unit determines the target position through second processing based on a position of a specific constituent of the subject different from the entirety, different from the first processing.

2. The control apparatus of claim 1, wherein in the first processing, the determination unit determines the target position such that in a first direction among a horizontal direction and a vertical direction of the angle of view, a distance from a first end portion of the angle of view to a first end portion of the subject is substantially equal to a distance from a second end portion of the angle of view to a second end portion of the subject.

3. The control apparatus of claim 2, wherein the first direction is a direction, among the horizontal direction and the vertical direction of the angle of view, in which an image height of the subject is greater.

4. The control apparatus of claim 2, wherein in the first processing, the determination unit determines the target position such that the subject becomes closer to one end portion of the angle of view in a second direction different from the first direction among the horizontal direction and the vertical direction of the angle of view.

5. The control apparatus of claim 1, wherein in the second processing, in a case where the specific constituent of the subject is not included in the image captured, the determination unit determines the target position such that the subject moves in a direction opposite from a direction of travel of the subject.

6. The control apparatus of claim 1, wherein in the second processing, in a case where the specific constituent of the subject is included in the image captured and a distance to the subject from an end portion of an angle of view corresponding to the direction of travel of the subject is not greater than a predetermined value, the determination unit determines the target position such that the distance becomes greater than the predetermined value.

7. The control apparatus of claim 1, wherein in a case where the entirety of the subject is not included in the image captured and the specific constituent of the subject is included in the image captured, the control unit does not change an angle of view for tracking the subject.

8. An image capturing apparatus comprising:

one or more processors; and a memory storing instructions which, when the instructions are executed by the one or more processors, cause the image capturing apparatus to function as:

an image capturing unit configured to capture an image;

a detection unit configured to detect a region of a subject in an image that has been captured;

a determination unit configured to determine a target position, in the image, of the subject detected, in a case where the subject is tracked; and a control unit configured to change an angle of view for shooting such that a position of the subject in the image becomes the target position, wherein in a case where the entirety of the subject is included in the image captured, the determination unit determines the target position through first processing based on a position of the entirety of the subject, and in a case where the entirety of the subject is not included in the image captured, the determination unit determines the target position through second processing based on a position of a specific constituent of the subject different from the entirety, different from the first processing.

9. The image capturing apparatus of claim 8, wherein in the first processing, the determination unit determines the target position such that in a first direction among a horizontal direction and a vertical direction of the angle of view, a distance from a first end portion of the angle of view to a first end portion of the subject is substantially equal to a distance from a second end portion of the angle of view to a second end portion of the subject.

10. The image capturing apparatus of claim 9, wherein the first direction is a direction, among the horizontal direction and the vertical direction of the angle of view, in which an image height of the subject is greater.

11. The image capturing apparatus of claim 9, wherein in the first processing, the determination unit determines the target position such that the subject becomes closer to one end portion of the angle of view in a second direction different from the first direction among the horizontal direction and the vertical direction of the angle of view.

12. The image capturing apparatus of claim 8, wherein in the second processing, in a case where the specific constituent of the subject is not included in the image captured, the determination unit determines the target position such that the subject moves in a direction opposite from a direction of travel of the subject.

13. The image capturing apparatus of claim 8, wherein in the second processing, in a case where the specific constituent of the subject is included in the image captured and a distance to the subject from an end portion of an angle of view corresponding to the direction of travel of the subject is not greater than a predetermined value, the determination unit determines the target position such that the distance becomes greater than the predetermined value.

14. The image capturing apparatus of claim 8, wherein in a case where the entirety of the subject is not included in the image captured and the specific constituent of the subject is included in the image captured, the control unit does not change an angle of view for tracking the subject.

15. A method of controlling a control apparatus, the method comprising:

detecting a region of a subject in an image that has been captured;

determining a target position, in the image, of the subject detected, in a case where the subject is tracked; and changing an angle of view for shooting such that a position of the subject in the image becomes the target position, wherein in a case where the entirety of the subject is included in the image captured, the target position is determined through first processing based on a position of the entirety of the subject in the determining, and in a case where the entirety of the subject is not included in the image captured, the target position is determined through second processing based on a position of a specific constituent of the subject different from the entirety, different from the first processing in the determining.

* * * * *